Figure 1:
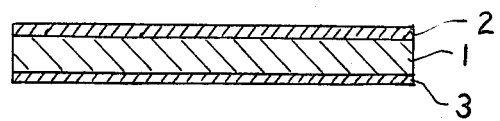

United States Patent [19]

Kunze

[11] 3,798,068
[45] Mar. 19, 1974

[54] ELECTROLYTIC AND GALVANIC CELLS AND METHOD OF MANUFACTURE THEREOF

[75] Inventor: Dieter Kunze, Kelkheim, Germany

[73] Assignee: Varta Aktiengesellschaft, Kelkheim/Ts., Germany

[22] Filed: Oct. 17, 1972

[21] Appl. No.: 298,259

[30] Foreign Application Priority Data
Oct. 18, 1971 Germany............................ 2151735
Oct. 18, 1972 Germany............................ 2151732

[52] U.S. Cl................ 136/6 LN, 136/83 R, 136/153
[51] Int. Cl. .......................................... H01m 35/00
[58] Field of Search ................. 136/6, 83, 153, 155

[56] References Cited
UNITED STATES PATENTS

| | | | |
|---|---|---|---|
| 3,701,686 | 10/1972 | Argue et al............................ | 136/83 |
| 3,663,299 | 5/1972 | Owens et al. ...................... | 136/83 R |
| 3,661,647 | 5/1972 | Owens et al. ...................... | 136/83 R |
| 3,558,357 | 1/1971 | Pakashaski....................... | 136/153 X |

Primary Examiner—A. B. Curtis
Assistant Examiner—C. F. Lefevour
Attorney, Agent, or Firm—Herbert L. Lerner

[57] ABSTRACT

An electrolytic cell, such as a control cell, or a galvanic cell, such as a primary cell, includes at least one silver electrode and a solid electrolyte, the latter consisting essentially of a mixture of 80 to 90 Mol percent silver iodide and 10 to 20 Mol percent silver tungstenate. The method of manufacturing the electrolytic or galvanic cell includes the steps of pressing the electrolyte into a tablet and thereafter pressing onto a first side of the electrolyte tablet a mixture of silver, electrolyte powder and possibly graphite; and pressing onto the second side of the tablet a mixture including graphite and electrolyte powder. In the manufacture of galvanic cells, the mixture pressed onto the second side also includes an iodine-yielding compound.

10 Claims, 2 Drawing Figures

3,798,068

ELECTROLYTIC AND GALVANIC CELLS AND METHOD OF MANUFACTURE THEREOF

SPECIFICATION

The invention of the instant application is directed to an electrolytic cell, and more particularly, to a cell suitable for use as a control cell, as well as to a galvanic cell, more particularly serving as a primary cell.

Cells having a silver electrode and a solid electrolyte are known per se, and silver halogenides, such as $RbAg_4I_5$, for example, have been in general use as the electrolyte.

Furthermore, electrolytic cells of this general type, that are adapted to function as control cells, that is, such cells which control processes of long duration or, as coulometers, measure amounts of current, are known to those skilled in the art. In such cells, a given amount of metal such as silver or copper, for example, is transferred by electrolysis from one electrode to the other. If the current intensity is kept constant, the time required for transferring the total amount of metal from one electrode to the other can be determined, and the voltage jumps occurring during electrolysis can serve to release certain processes, give signals or carry out switching operations. When used as a coulometer or a current quantity integrator, the quantity of metal transferred from a supply electrode to the counterelectrode corresponds to the product of the current intensity and the metal transfer time. From the time it takes to return the quantity of metal, at constant current intensity, the amount of current or amperage is determined. In this manner, it is possible, for example, to measure the operational life span or durability of electrical appliances. Electrolytic cells of this type may comprise aqueous electrolytes, organic electrolytes or solid electrolytes. Silver-halogenide compounds have been employed generally as solid electrolytes.

By using solid electrolytes, it is possible to produce cells that exclusively contain solid components. An obvious advantage of such cells is that they possess good mechanical and chemical stability, have a broad temperature operating range and a long life span, and are relatively simply adaptable for miniaturization. The predominant characteristics of solid electrolytes are high ion conductivity, low electron conductivity, and chemical stability. The silver halogenides mentioned above, such as $RbAg_4I_5$, possess a relatively high ion conductivity, but, are unstable in the presence of moisture. A still further disadvantage thereof is the high cost of such materials.

It is accordingly an object of this invention to provide a galvanic cell, such as a primary cell, or an electrolytic cell such as a control cell, that is free from the foregoing disadvantages of the prior-art cells of these general types.

Another object of this invention is to provide such a cell with a solid electrolyte having a high silver-ion conductivity which is dischargeable at relatively high current densities.

A further object of the present invention is to provide a relatively simple, inexpensive, and easy-to-practise method of producing such a cell.

With the foregoing and other objects in view, there is provided in accordance with the invention, a cell having a solid electrolyte, which consists essentially of silver iodide and silver tungstenate.

In accordance with a further feature of the invention, the electrolyte contains about 80 to 90 Mol percent AgI and 10 to 20 Mol percent $Ag_2WO_4$. Such an electrolyte has been found to be stable in the presence of moisture and is less expensive than the heretofore employed substances such as $RbAg_4I_5$, for example. It has a silver ion-conductivity of substantially $10^{-2}$ (Ohm. cm)$^{-1}$, which does not change substantially even after being tempered at 110°C for one week. At a temperature of −40°c, for example, the specific conductivity is substantially $10^{-3}$ (Ohm. cm)$^{-1}$.

In accordance with a preferred feature of the invention, the electrolyte is composed of substantially 85 Mol percent AgI and substantially 15 Mol percent $Ag_2WO_4$.

In the electrolytic cell of the invention, one electrode has silver as an active component thereof, while the other electrode is an inert electrode and is formed of a mixture consisting essentially of electrolyte and graphite, or of a chemically resistant metal such as gold or platinum.

The invention also contemplates a method of manufacturing the cell which comprises the steps of; mixing the components of the electrolyte; heating the mixed components to a molten state and thereafter; cooling the molten mixture; pulverizing the thus solidified mixture; compressing it into individual tablets; pressing a mixture of silver and electrolyte with or without graphite onto one side of the electrolyte tablet and pressing a mixture of graphite and electrolyte powder onto the other side of the tablet.

The galvanic cell of the invention is produced by the method of the invention which comprises first mixing the components of the electrolyte, then heating the mixture to molten state; thereafter chelling the molten mixture and, after solidification thereof, pulverizing it and then compressing it into tablets. At this point in the manufacturing operation the electrolyte is in a glassy, amorphous state. Thereafter, a mixture of silver and electrolyte powder at a ratio of substatially 4:1 by weight (with or without graphite), for example, is pressed onto one side of the electrolyte tablet and onto the other side of the tablet, a mixture of graphite, an iodine-yielding substance and electrolyte powder is pressed at a ratio by weight of 2:2:1.

An exemplary embodiment of the galvanic cell according to the invention had a diameter of 20mm and a thickness of 4mm, the cell resistance being in the 50–100 Ohm. range, and the equilibrium potential being approximately 600mV. The electron conductivity of the electrolyte contributes very little i.e., negligibly, to the total conductivity, since such conductivity is predominantly determined by the conductivity of the silver ions. At a constant discharge current of 200$\mu$A, the cell delivers a voltage of about 400mV.

Features which are considered characteristic for the invention are set forth in the appended claims.

The electrolytic or galvanic cell and method of manufacture thereof, however, together with additional objects and advantages thereof, will best be understood from the following description.

Although the invention has been described herein as an electrolytic or galvanic cell and method of making the same, it is nevertheless not intended to be limited to the details set forth herein, since various modifications may be made therein without departing from the spirit of the invention and within the scope and range of equivalence of the claims.

Other features which are considered as characteristic for the invention are set forth in the appended claims.

Although the invention is illustrated and described herein as electrolytic and galvanic cells and method of manufacture thereof, it is nevertheless not intended to be limited to the details shown, since various modifications may be made therein without departing from the spirit of the invention and within the scope and range of equivalents of the claims.

Figure 2:
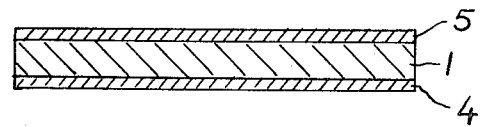

The invention however, together with additional objects and advantages thereof will be best understood from the following description when read in connection with the accompanying drawing in which:

FIG. 1 is a diagrammatic sectional view of an electrolytic cell constructed in accordance with the invention; and FIG. 2 is a similar view of a galvanic cell.

Referring to the drawing, there is shown in FIG. 1 an electrolytic cell having a solid electrolyte formed of a mixture of AgI and $Ag_2WO_4$. Also included in the electrolytic cell of FIG. 1 is an electrode 2 having silver as an active component thereof, and an electrode 3 formed of inert material such as a mixture of electrolyte and graphite or of a chemically resistant metal such as gold or platinum.

In FIG. 2, the galvanic cell has a solid electrolyte 1 as in the electrolyte cell of FIG. 1, however, the positive electrode 4 thereof is formed of a mixture of graphite and iodine or of a mixture of graphite, an iodine yielding substance such as $RbI_3$ and electrolyte. The negative electrode 5 of the galvanic cell has silver as an active substance thereof.

I claim:

1. In an electric cell, an electrode having silver as active substance and a solid electrolyte, said solid electrolyte consisting essentially of silver iodide and silver tungstenate.

2. An electric cell as claimed in claim 1, wherein said electrolyte contains about 80 to 90 Mol. percent AgI and about 10 to 20 Mol. percent $Ag_2WO_4$.

3. An electric cell as claimed in claim 1, wherein said electrolyte is a mixture of about 85 Mol. percent AgI and about 15 Mol. percent $Ag_2WO_4$.

4. An electric cell as claimed in claim 1, wherein said electrolyte is in a glassy, amorphic state.

5. An electric cell as claimed in claim 1, wherein the cell is a galvanic cell, and including an electrode formed of a mixture of graphite, electrolyte and an iodine-yielding substance.

6. An electric cell as claimed in claim 1, wherein said electrode is formed of a mixture of graphite, electrolyte and silver.

7. An electric cell as claimed in claim 1, wherein at least one electrode is an inert electrode and is formed of a mixture of electrolyte and graphite.

8. A method of producing an electric cell as claimed in claim 1, comprising the steps of: mixing AgI and $Ag_2WO_4$ as essential constituents of said electrolyte; heating said mixed constituents to a molten state; chilling said molten mixture into a solid state; pulverizing said solid mixture; pressing said pulverized mixture into tablets; pressing onto a first side of said tablet a mixture of silver and electrolyte powder; and onto the second side of said tablet a mixture of graphite and electrolyte powder.

9. A method of producing an electric cell as claimed in claim 8, wherein the mixture pressed onto the first side of said tablet also contains graphite.

10. A method of producing an electric cell as claimed in claim 9, wherein the cell is a galvanic cell wherein the mixture pressed onto the second side of said tablet also contains an iodine-yielding compound.

* * * * *